(12) United States Patent
Littleson

(10) Patent No.: US 8,990,156 B2
(45) Date of Patent: Mar. 24, 2015

(54) DIGITAL ASSET MANAGEMENT METHOD AND APPARATUS

(75) Inventor: Russell James Littleson, Victoria (AU)

(73) Assignee: Interdomain Pty Ltd., Victoria (AU)

( * ) Notice: Subject to any disclaimer, the term of this patent is extended or adjusted under 35 U.S.C. 154(b) by 0 days.

(21) Appl. No.: 13/260,681

(22) PCT Filed: Mar. 29, 2010

(86) PCT No.: PCT/AU2010/000363
§ 371 (c)(1),
(2), (4) Date: Dec. 20, 2011

(87) PCT Pub. No.: WO2010/108238
PCT Pub. Date: Sep. 30, 2010

(65) Prior Publication Data
US 2012/0084256 A1    Apr. 5, 2012

(30) Foreign Application Priority Data
Mar. 27, 2009    (AU) ................................ 2009901339

(51) Int. Cl.
*G06F 17/00* (2006.01)
*G06F 17/30* (2006.01)
*H04L 29/08* (2006.01)

(52) U.S. Cl.
CPC ............ *G06F 17/3002* (2013.01); *H04L 67/06* (2013.01)
USPC .......................................... 707/626; 707/610

(58) Field of Classification Search
CPC ........................ G06F 17/30017; G06F 17/3002
See application file for complete search history.

(56) References Cited

U.S. PATENT DOCUMENTS

| | | | |
|---|---|---|---|
| 7,720,905 B1 * | 5/2010 | O'Connell, Jr. ............... | 709/202 |
| 7,822,768 B2 * | 10/2010 | Maymir-Ducharme et al. .............................. | 707/776 |
| 8,010,905 B2 * | 8/2011 | Ryan et al. ...................... | 715/765 |
| 8,281,027 B2 * | 10/2012 | Martinez et al. ............... | 709/231 |
| 8,538,997 B2 * | 9/2013 | Arrouye et al. ................ | 707/799 |
| 8,607,354 B2 * | 12/2013 | Levy et al. ....................... | 726/26 |
| 2004/0111415 A1 * | 6/2004 | Scardino et al. ................ | 707/10 |
| 2004/0181548 A1 | 9/2004 | Thomas et al. | |
| 2005/0197108 A1 | 9/2005 | Salvatore et al. | |
| 2006/0179080 A1 | 8/2006 | Meek et al. | |
| 2006/0184540 A1 * | 8/2006 | Kung et al. ...................... | 707/10 |
| 2006/0206485 A1 * | 9/2006 | Rubin et al. ...................... | 707/9 |
| 2007/0050467 A1 * | 3/2007 | Borrett et al. .................. | 709/213 |
| 2007/0050834 A1 * | 3/2007 | Royo et al. ..................... | 725/119 |
| 2008/0109482 A1 | 5/2008 | Macchletti et al. | |
| 2008/0208820 A1 * | 8/2008 | Usey et al. ......................... | 707/3 |
| 2008/0215633 A1 * | 9/2008 | Dunkeld et al. ............ | 707/104.1 |
| 2008/0216139 A1 * | 9/2008 | Liwerant et al. ............... | 725/113 |
| 2009/0234711 A1 * | 9/2009 | Ramer et al. .................... | 705/10 |

(Continued)

OTHER PUBLICATIONS

International Search Report, PCT/AU2010/000363, May 21, 2010.

*Primary Examiner* — Miranda Le
(74) *Attorney, Agent, or Firm* — K&L Gates LLP

(57) ABSTRACT

In various embodiments, a machine-implemented process of digital asset management is disclosed. The process comprises, at a first physical location: storing master digital asset files; generating at least one derivative digital asset file from each master digital asset file; storing the derivative digital asset file; and uploading copies of a sub-set of the stored derivative digital asset files to a second physical location. The process of digital asset management further comprises, at the second physical location, storing the uploaded copies of a subset of the stored derivative digital asset files.

2 Claims, 4 Drawing Sheets

(56) References Cited

U.S. PATENT DOCUMENTS

2009/0259623 A1* 10/2009 Mooneyham et al. ............ 707/3
2009/0282057 A1* 11/2009 Thomas ....................... 707/100
2010/0064052 A1* 3/2010 Pickens et al. ................ 709/231

* cited by examiner

DIGITAL ASSET MANAGEMENT METHOD AND APPARATUS

FIELD OF THE INVENTION

The present invention relates to digital asset management, and is particularly applicable to the management of image files, video files, audio files and the like.

BACKGROUND OF THE INVENTION

Digital asset management (DAM) includes the ingesting, annotating, cataloguing, storing and retrieving of digital assets, such as digital photographs, animations, videos and music. Examples of derivatives from digital assets include, but are not limited to, images which are copies, at a lower resolution, of the master digital image. Digital asset management systems are computer software and/or hardware systems that aid in the process of digital asset management. In this context, the term "ingesting" refers to putting digital assets into an archive. To put data into an archive ("to ingest it"), the correct data needs to be identified and the target location for the data movement needs to be identified. An ingestion engine is a piece of software that, at a minimum, provides:

a mechanism for selecting and moving data;
a means for validating data contents;
a method for confirming that writes have occurred correctly and completely;
a means for un-ingesting data when required.

In existing DAM systems, the owner of the digital asset stores the master file, together with the derivatives from that master file, in one location. That location is either local (ie, on the premises of the data owner) or remote (eg, at an externally hosted data centre).

SUMMARY OF THE INVENTION

In contrast, in one aspect, embodiments of the present invention provide a machine-implemented process of digital asset management, the process comprising:

at a first location:
  storing master digital asset files;
  generating at least one derivative digital asset file from each master digital asset file;
  storing the derivative digital asset files; and
  uploading copies of a sub-set of the stored derivative digital asset files to a second location, and
at the second location, storing the uploaded copies of a sub-set of the stored derivative digital asset files.

It is preferred that the machine-implemented process of digital asset management further comprises the making available:

for access by at least one user who is at a third location which is separate from both the first location and the second location;
of the copies of a sub-set of the stored derivative digital asset files which have been uploaded to the second location.

It is preferred that the machine-implemented process of digital asset management further comprises the making available at the first location, for access by at least one user who is at the third location; of copies of at least one derivative digital asset file:

which was generated from a master digital asset file; and
which is not a member of the sub-set of derivative digital asset files.

In another aspect, embodiments of the present invention provide a machine implemented process of digital asset management comprising the accessing by a user who is at a third location of the copies of a sub-set of the stored derivative digital asset files which have been uploaded to the second location as described above.

In another aspect, embodiments of the present invention provide apparatus for implementing a process of digital asset management, the apparatus comprising:

at a first location, means for:
  storing master digital asset files;
  generating at least one derivative digital asset file from each master digital asset file;
  storing the derivative digital asset files; and
  uploading copies of a sub-set of the stored derivative digital asset files to a second location, and
at the second location means for, storing the uploaded copies of a sub-set of the stored derivative digital asset files.

It is preferred that the apparatus for implementing a process of digital asset management further comprises means for making available:

for access by at least one user who is at a third location which is separate from both the first location and the second location;
of the copies of a sub-set of the stored derivative digital asset files which have been uploaded to the second location.

It is preferred that the apparatus for implementing a process of digital asset management further comprises means for making available at the first location, for access by at least one user who is at the third location; of copies of at least one derivative digital asset file:

which was generated from a master digital asset file; and
which is not a member of the sub-set of derivative digital asset files.

Accordingly embodiments of the present invention allow the owners of digital assets to store the original copies of their digital files in a secure environment behind a firewall in a large storage area for preservation and restoration purposes while still using a hosted solution to publish derivatives of the digital file over the Internet, an intranet or an extranet. Organizations can outsource their digital management requirements while they manage the storage of their valuable digital master files. Organizations have the ability to independently manage access rights to derivatives stored at a out-sourced hosting provider while independently managing access to the original masters.

BRIEF DESCRIPTION OF THE DRAWINGS

For a better understanding of the invention, and to show how it may be carried into effect, embodiments of it are shown, by way of non-limiting example only, in the accompanying drawings. In the drawings.

DESCRIPTION OF PREFERRED EMBODIMENTS OF THE INVENTION

Overall System Architecture

Figure 1:
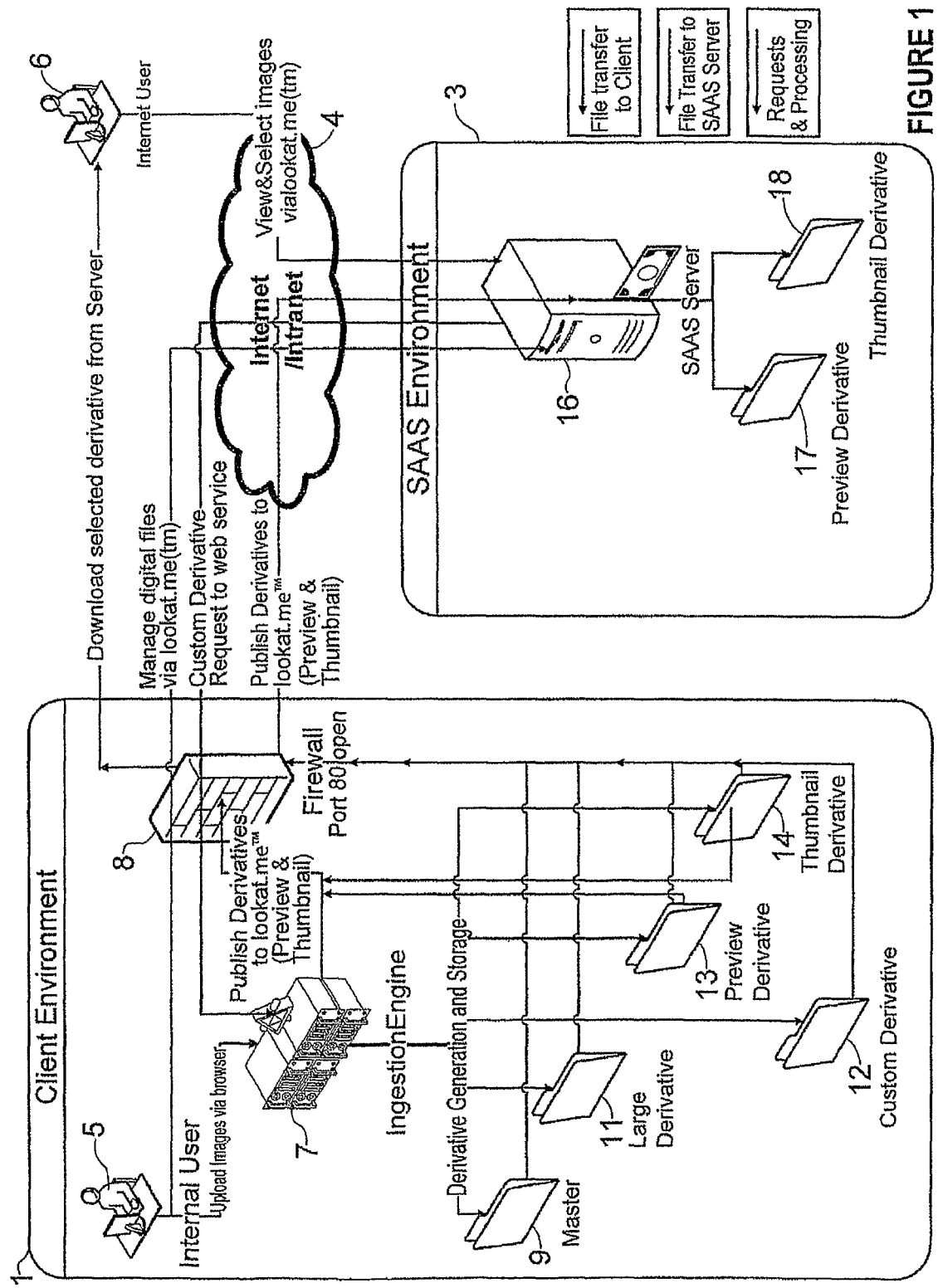
FIG. 1 is a schematic diagram which illustrates system architecture for implementing embodiments of the invention.

FIG. 1 illustrates a system 1 for implementing embodiments of the present invention.

The system 1 comprises a client environment 2 and a "software as a service" (SAAS) environment 3. The client environment 2, the SAAS environment 3 and external users 6 communicate over a network 4 which is preferably the Internet or an intranet.

In the client environment 2, an ingestion engine server 7 connects to the network 4 by way of a firewall 8. Internal users 5 using a web interface communicate with the ingestion engine server 7 over an internal network which is not illustrated in the figure. The ingestion engine stores files on a storage area network (SAN) or on a local hard drive. In FIG. 1, those files are illustrated as being stored in a number of folders, comprising a master files folder 9, a large derivative files folder 11, a custom derivative files folder 12, a preview derivative files folder 13 and a thumbnail derivative files folder 14.

The SAAS environment 3 includes an SAAS server 16, a SAAS preview derivative files folder 17 and a thumbnail derivative files folder 18.

Figure 2:
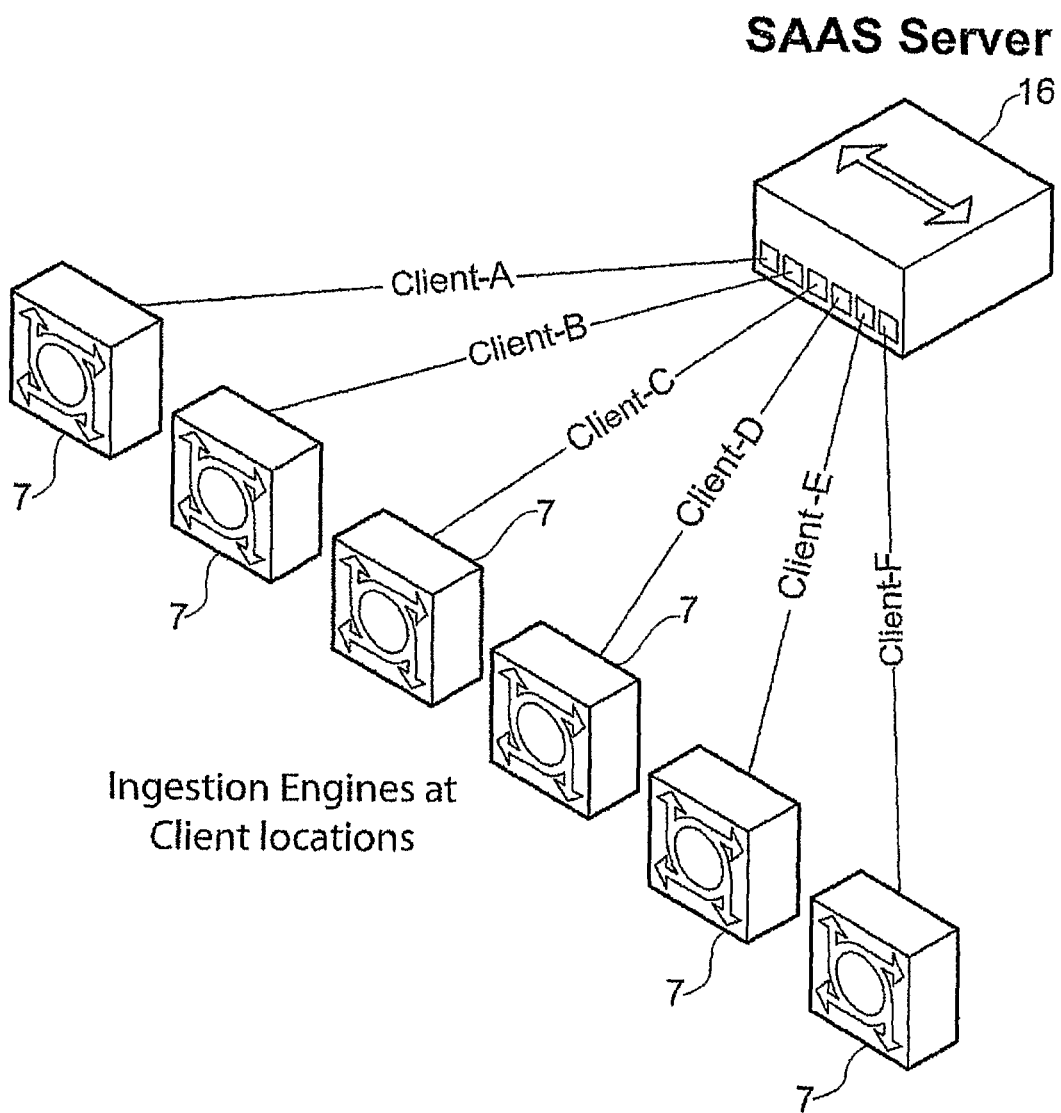
FIG. 2 is another schematic diagram which illustrates system architecture for implementing embodiments of the invention.

As is illustrated in FIG. 2, it is preferred that the SAAS server 16 has the capability of providing services to any one or more of a plurality of ingestion engine servers 7 on demand.

Operation

Figure 3:
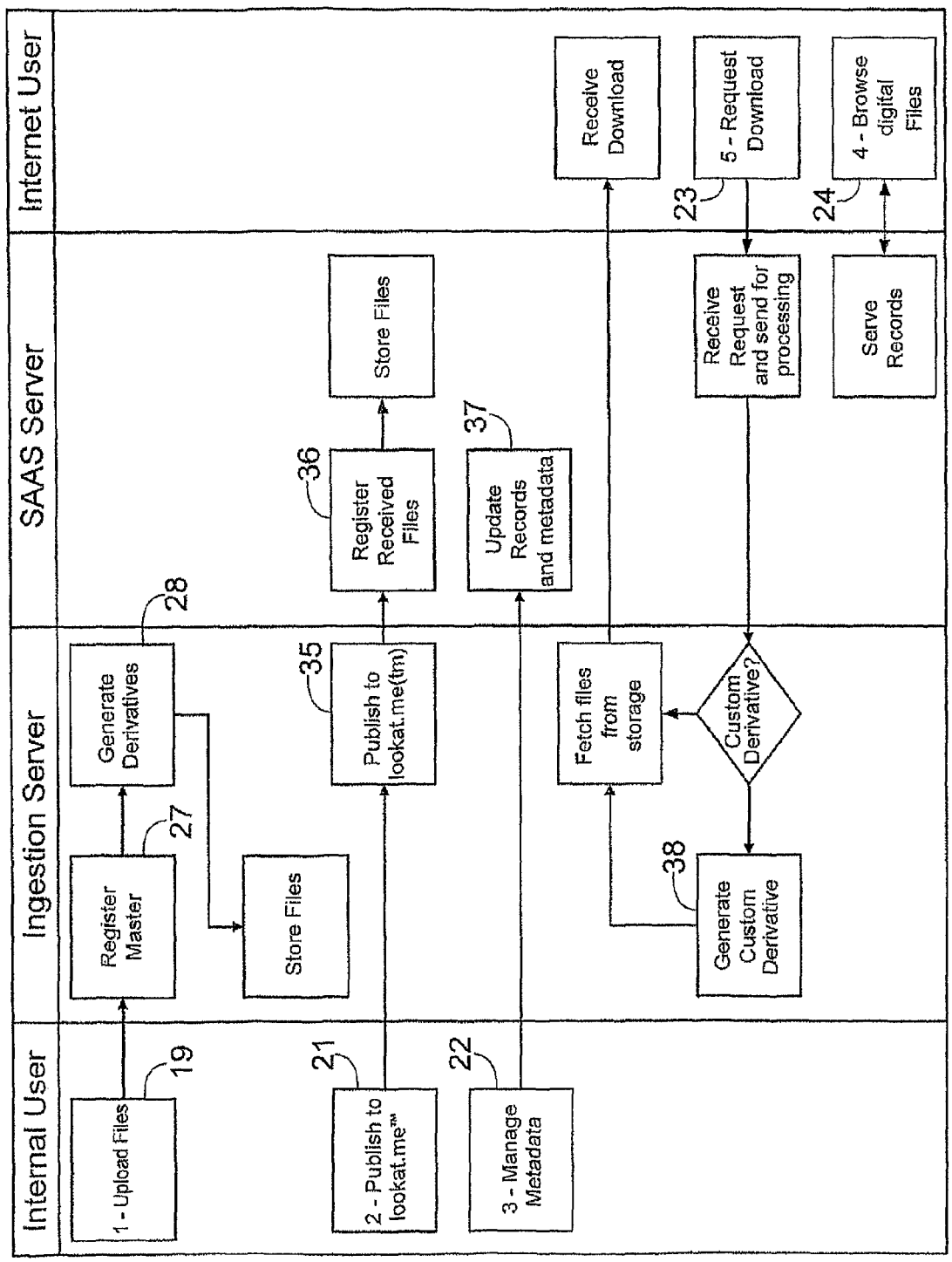
FIG. 3 contains work-flow diagrams which illustrate operation of preferred embodiments of the present invention.

FIG. 3 contains work-flow diagrams which illustrate operation of preferred embodiments of the present invention.

The "upload files" workflow is illustrated at 19 in FIG. 3. An internal user 5 collects digital master files for uploading to the ingestion server. Examples of master files include raw scanned, photographed or record files. Once ready, the internal user 5 logs into the ingestion engine server 7 and logs into the ingestion engine via a web browser to visit an upload page (which is not illustrated in the drawings). In the upload page, the internal user 5 selects the folder that contains the images and clicks an upload button. This function uploads images to the master folder 9 for processing.

A listener component on the ingestion engine periodically monitors the master 9 folder for any new files. Once new files are located the ingestion engine traverses through the master folder 9, registers 27 the files in the ingestion engine database 29 and generates derivatives for this file. As the derivatives files are generated 28 the ingestion engine moves these derivative files to the appropriate folder 11, 12, 13 or 14 based on the derivative structure.

Figure 4:
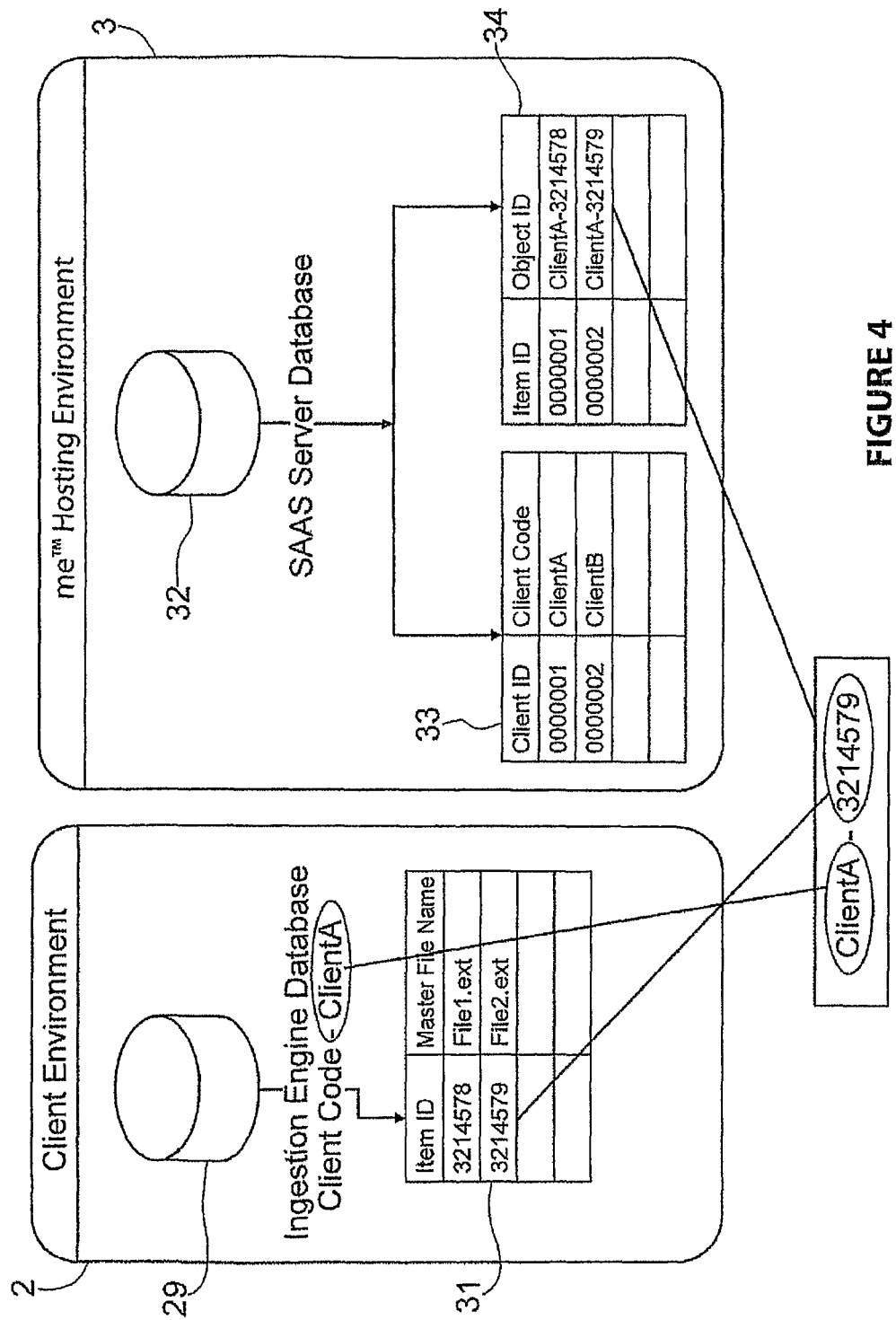
FIG. 4 illustrates relationships among data elements.

The "publish to SAAS server" workflow is illustrated at 21 in FIG. 3. Once files have been ingested by the ingestion server they are available for the internal users 5 to browse via a user interface. The internal users 5 select the preview and thumbnail files to publish 35 to SAAS server and initiate the publish process. The files are sent via HTTP protocol through port 80 to the SAAS server 16. The SAAS server 16 authenticates the request to publish the preview and thumbnail files and if the user's credentials are correct the SAAS server 16 proceeds to accept the preview and thumbnail files. Preferably the user's credentials include a client code, a user identifier and a password. The SAAS server 16 generates an entry in the object table 34 of the SAAS server database 32 as is illustrated in FIG. 4. Each preview file and each thumbnail file is stored 36 as a record in the SAAS server database 32. Each record is assigned an object identifier and an item identifier in the object table. The object identifier which is assigned to the object in the table 34 is the concatenation of the client identifier of the relevant internal user 5 and the item identifier of the object within a master file name data table 31 in the ingestion engine database 29.

As is illustrated by work flow 22 in FIG. 3, an internal user 5 who has login privileges to do so can login to the SAAS environment 3 and locate the files that were uploaded via the ingestion engine. The uploaded files have details pages associated to them which the internal user 5 can use to edit and manage 37 metadata associated to the images.

As is illustrated by work flow 24 in FIG. 3, a registered user associated with the client identifier of an ingestion engine can log in to the SAAS environment 3, and view images that were uploaded by that ingestion engine. Depending, on the permissions assigned to such user, they can perform multiple actions that are available within the SAAS environment 3 on the images to which they have access.

As is illustrated by workflow 23 in FIG. 3, external users 6 can select a list of images and request the download of those images. The SAAS server refers to the object identifier of the image to determine the client identifier of the files requested for download and the type of derivative. Once the client identifier is determined, a web service request is sent to the ingestion engine 7 that prepares the files for delivery. These files are compressed for faster downloads. If the requested derivative is not one of the standard derivatives that reside with the ingestion engine, then the ingestion engine initiates a custom derivative generation process 38 to create the requested derivative. When the requested derivative file(s) are ready, a response is send back to the SAAS server. One preferred form for notifying this response to the requester is by e-mail. Preferably, this e-mail contains a link back to the SAAS server. The user can visit the "my requests" page and click on the link to download.

The requestor can download the files directly from the client ingestion engine server 7. The ingestion engine server 7 tracks the files which have been uploaded and derivatives which have been generated as it stores these in a logical structure based on derivative configuration.

Various embodiments of the invention may be embodied in many different forms, including computer program logic for use with a processor (eg., a microprocessor, microcontroller, digital signal processor, or general purpose computer), programmable logic for use with a programmable logic device (eg., a field programmable gate array (FPGA) or other PLD), discrete components, integrated circuitry (eg., an application specific integrated circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locater). Source code may include a series of computer program instructions implemented in any of various programming languages (e.g., an object code, an assembly language, or a high-level language such as Fortran, C, C++, JAVA, Ruby, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the internet or world wide web).

Hardware logic (including programmable logic for use with a programmable logic device) implementing all or part of the functionality where described herein may be designed using traditional manual methods, or may be designed, captured, simulated, or documented electronically using various tools, such as computer aided design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the interne or world wide web).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Throughout this specification, the words "comprise", "comprising", and corresponding parts of speech are to be taken to specify the presence of stated features, integers, steps or components but does not preclude the presence or addition of one or more other features, integers, steps, components or groups thereof.

In the claims, each dependent claim is to be read as being within the scope of its parent claim or claims, in the sense that a dependent claim is not to be interpreted as infringed unless its parent claims are also infringed.

The invention claimed is:

1. A method comprising:
   ingesting a digital master file by an ingestion server behind a firewall;
   by the ingestion server:
      creating large derivative files, preview derivative files, and thumbnail derivative files from the digital master file, and
      publishing the preview derivative files and the thumbnail derivative files to a software-as-a-service (SAAS) server separated from the ingestion server by the firewall; and
   by the SAAS server:
      providing viewing of the preview derivative files or the thumbnail derivative files to an external client outside the firewall, and
      managing downloading of the digital master file or the large derivative files by the ingestion server in response to a request by the external client in association with the viewing of the preview derivative files or the thumbnail derivative files,
      managing creation of a custom derivative file from the digital master file by the ingestion server in response to a request by the external client based on the viewing of the preview derivative files or the thumbnail derivative files, and
      managing downloading of the custom derivative file from the digital master file by the ingestion server in response to a request by the external client based on the viewing of the preview or thumbnail derivative files.

2. A system comprising:
   a memory;
   an ingestion server separated by a firewall from a software-as-a-service (SAAS) server;
   wherein the ingestion server is configured to:
      create large derivative files, preview derivative files, and thumbnail derivative files from a digital master file, and
      publish the preview derivative files and thumbnail derivative files to the SAAS server; and
   wherein the SAAS server is configured to:
      provide viewing of the preview derivative files or the thumbnail derivative files to an external client outside the firewall, and
      manage downloading of the digital master file or the large derivative files by the ingestion server in response to a request by the external client based on the viewing of the preview derivative files or the thumbnail derivative files,
      manage creation of a custom derivative file from the digital master file by the ingestion server in response to a request by the external client based on the viewing of the preview derivative files or the thumbnail derivative files, and
      manage downloading of the custom derivative file from the digital master file by the ingestion server in response to a request by the external client based on the viewing of the preview derivative files or the thumbnail derivative files.

* * * * *